Jan. 26, 1960 L. A. DURANT 2,922,575
ELECTRIC CREDIT ACCUMULATOR
Filed Feb. 14, 1957 4 Sheets-Sheet 1

Inventor
Lydon A. Durant
by Lloyd Andrew

Jan. 26, 1960 L. A. DURANT 2,922,575
ELECTRIC CREDIT ACCUMULATOR
Filed Feb. 14, 1957 4 Sheets-Sheet 2
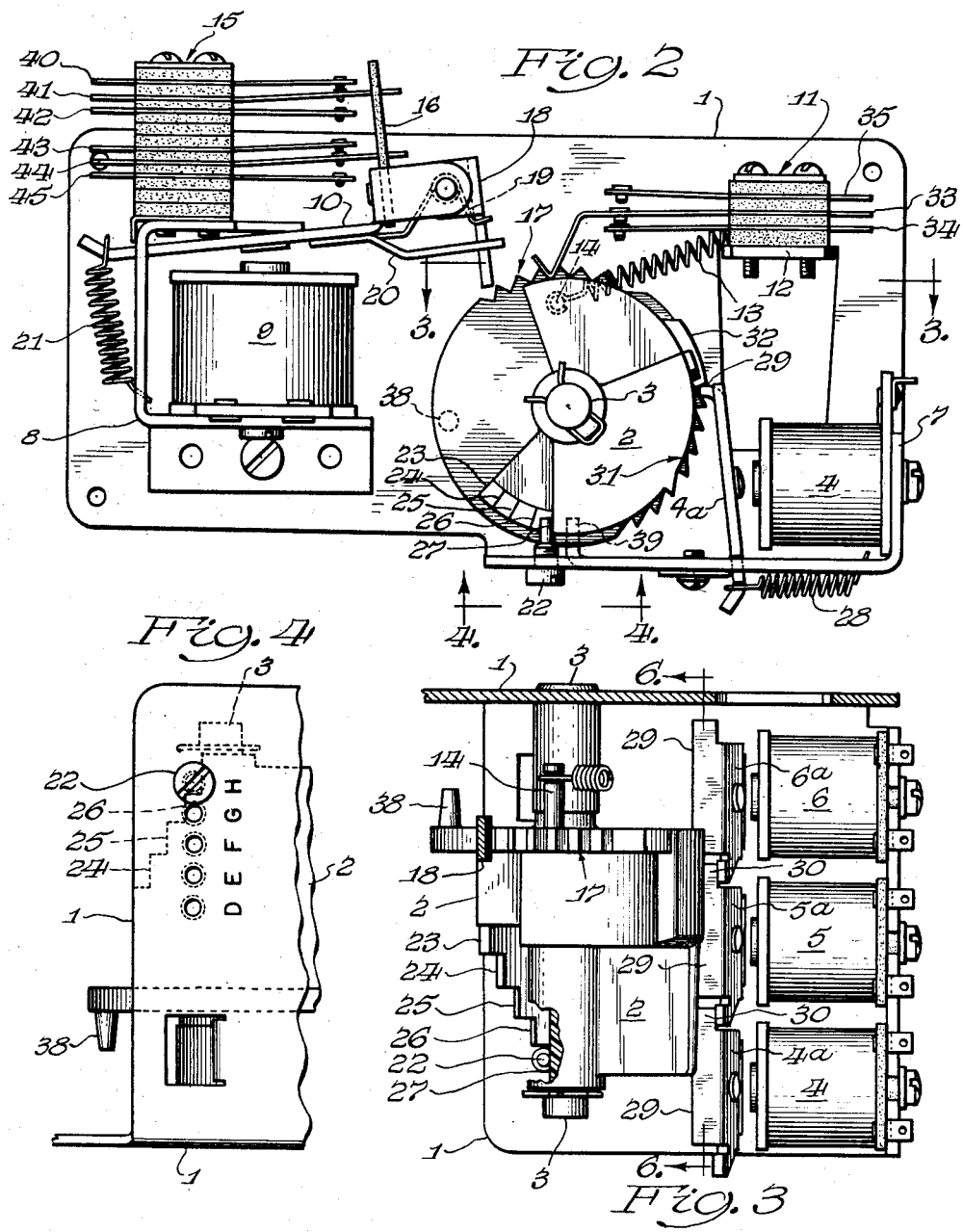
Inventor
Lydon A. Durant
by Lloyd Jan. 26, 1960 — L. A. DURANT — 2,922,575
ELECTRIC CREDIT ACCUMULATOR
Filed Feb. 14, 1957 — 4 Sheets-Sheet 3
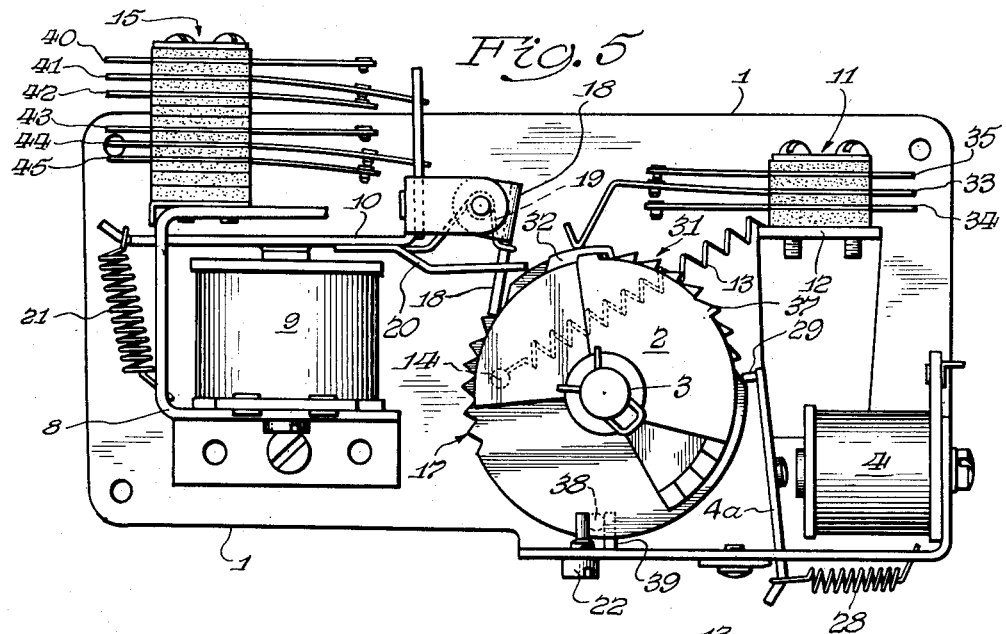
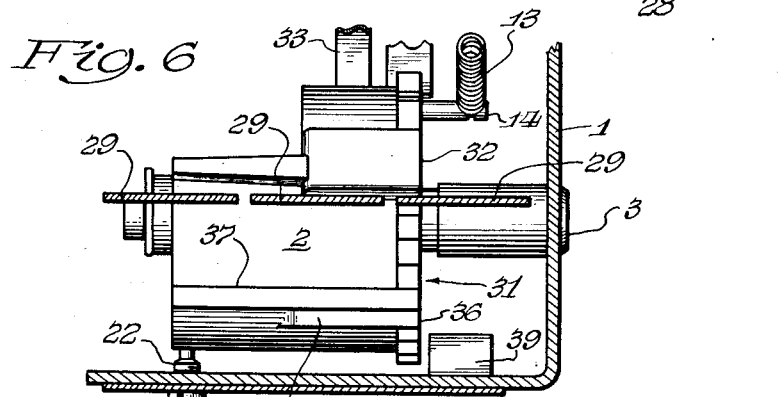
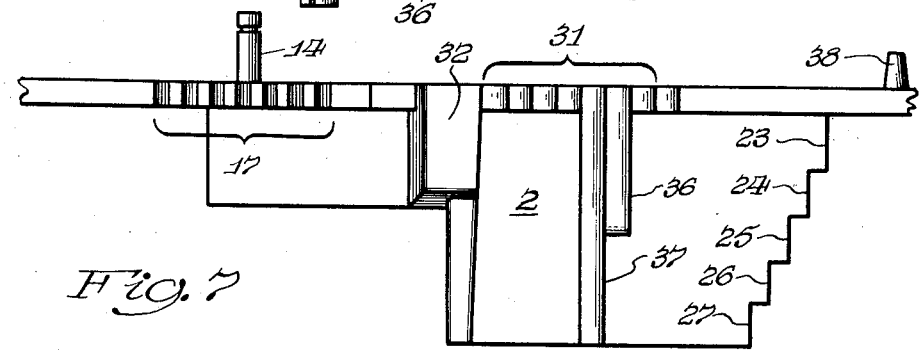
Inventor
Lydon A. Durant
by Lloyd Johnson

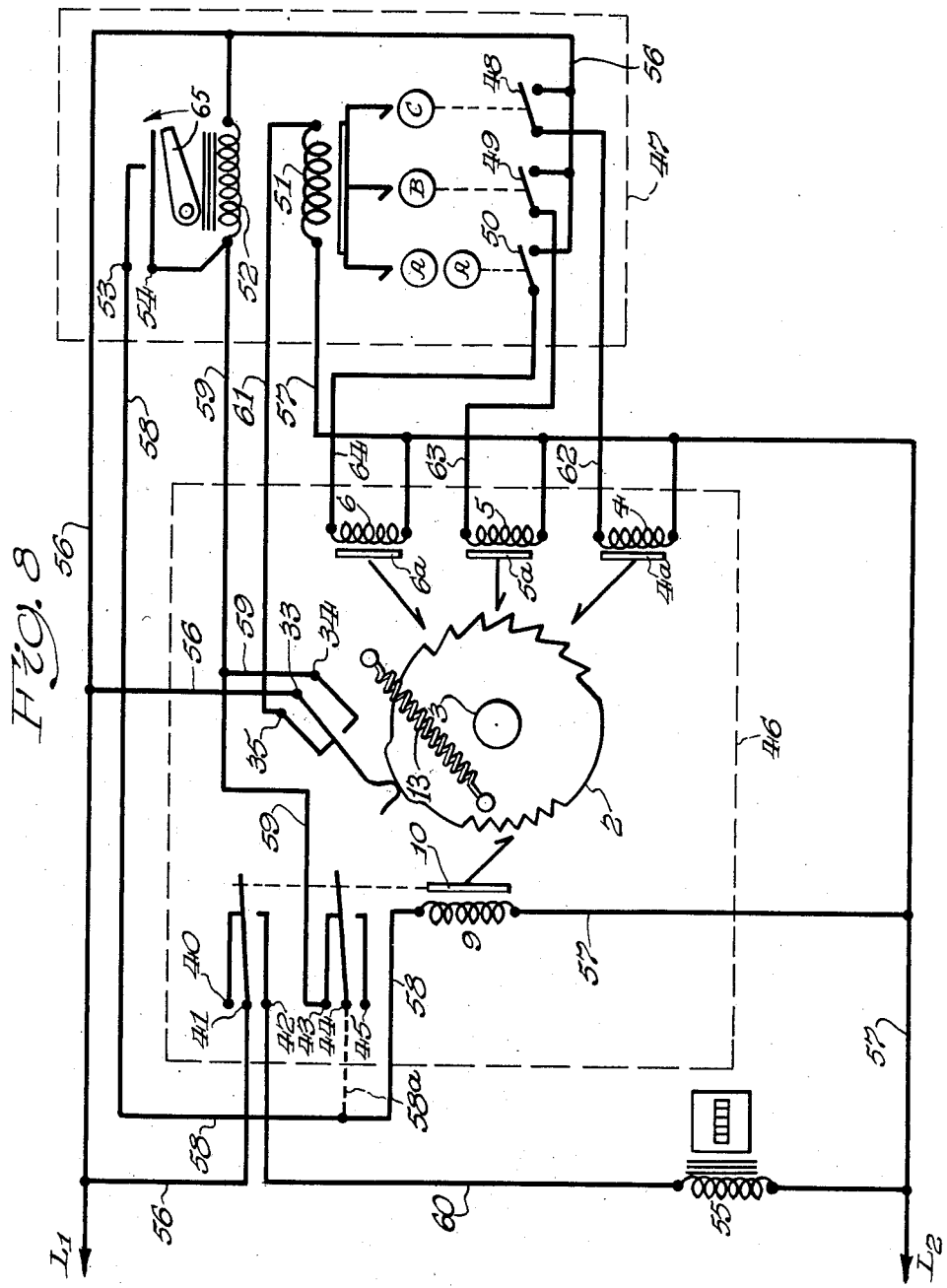

United States Patent Office 2,922,575
Patented Jan. 26, 1960

2,922,575

ELECTRIC CREDIT ACCUMULATOR

Lydon A. Durant, Chicago, Ill., assignor to United Music Corporation, Chicago, Ill., a corporation of Illinois Application February 14, 1957, Serial No. 640,208

5 Claims. (Cl. 235—132)

This invention relates in general to electro-mechanical credit devices more particularly to a mechanism for accumulating units of credit value responsive to a variable plurality of electric impluses, including means for energizing a machine for rendering service, vending merchandise or machine operations corresponding to selected predetermined electric impulses.

Credit accumulating and debiting systems prior to this invention usually employ electric stepping contact switches or complicated mechanical escapement means to add and subtract units of value. Both of which are costly to manufacture, difficult to service, and not readily adaptable to a quick change of unit credit values.

The present invention overcomes the above objections and disadvantages by the provision of a relatively simple low cost mechanism using a rotatable drum means actuated by electric magnets.

A principal object of the invention is the provision of a device adjustably responsive to a plurality of electric credit and debit impulses for energizing a machine a selected predetermined number of cycles corresponding with predetermined credit values, or for operating a machine one cycle for each predetermined total number of credit impulses.

A further object of the invention is the provision of a rotatable credit-debit drum adapted to be rotated in different steps corresponding to a plurality of different electric impulses.

Another object of the invention is the provision of a plurality of mechanically interconnected electromagnets, operatively related to a rotatable drum for rotating same different predetermined steps when said magnets are selectively energized corresponding with different credit values.

Another object of the invention is the provision of a rotatable credit-debit drum having a plurality of radially spaced steps thereon and an adjustable stop abutment for engaging a selected one of said steps for limiting the movement of said drum to correspond with preselected different maximum credit values.

These and other objects and advantages in one embodiment of the invention are described and shown in the appended specification and drawings in which:

Figure 2 is a side elevation of the mechanism shown in Fig. 1.

Figure 3 is a fragmentary top view of the mechanism.

Figure 4 is a fragmentary bottom view of the mechanism shown in Fig. 3.

Figure 5 is the same as Fig. 2 with elements in changed position.

Figure 6 is a fragmentary cross section taken through section line 6—6, Fig. 3.

Figure 7 is a planar development of the drum element of the mechanism.

Figure 8 is a schematic electric circuit of the mechanism connected to a portion of a typical selective device.

Figure 1:
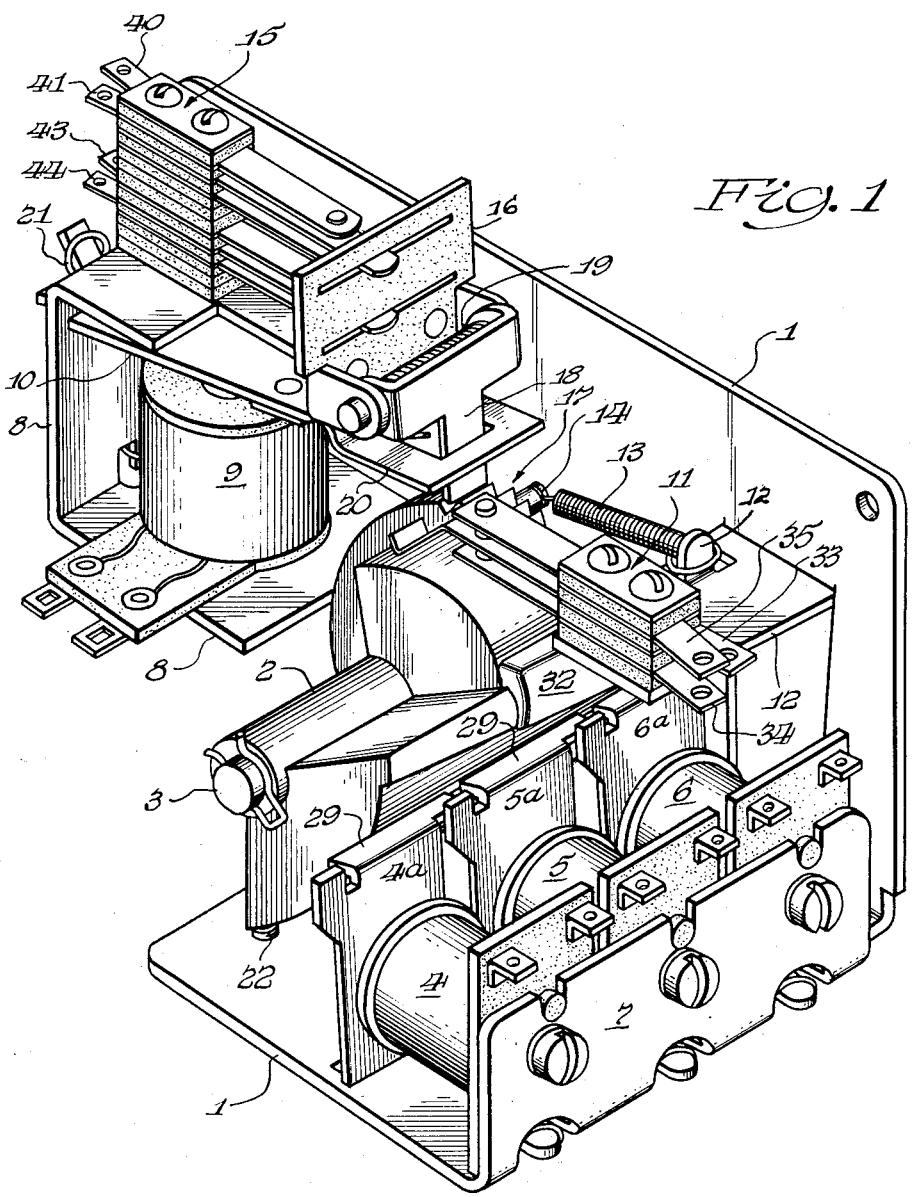
Figure 1 is a perspective view of the mechanism.

The particular embodiment of the mechanism hereinafter described is adapted to be used in connection with a coin operated phonograph. It is to be noted that the mechanism is adaptable to a variety of other machines dependent for operation upon the selective accumulation and debiting of electric impulses.

Referring to Fig. 1, a frame 1 supports all elements of the mechanism, including a cylindrical rotor 2 journalled for rotation on a shaft 3 fixed to the frame. Three electromagnetic credit coils 4, 5 and 6 are retained to flange 7 of the frame by screws threaded into the cores of the coils. A master control switch assembly 11 is supported in working relation with rotor 2 by extension 12 of frame 1. Rotor drive spring 13 is retained at one end on pin 14 in the rotor, and by extension 12 at its opposite end as shown, and normally urges the rotor to rotate in credit direction.

A sub-frame 8 secured to frame retains electromagnetic restore coil 9 in working relation with an armature 10 and a signal switch assembly 15 supported by sub-frame 8 and connected to armature 10 by insulating plate 16.

Referring to Figs. 2 and 3, the rotor 2 is provided with a plurality of restore teeth 17 around a portion of its periphery. A pawl 18 for driving the rotor in debit direction is pivotally secured to armature 10 and is normally urged into position shown by a tortion spring against a stop member 20. The armature is hinged to sub-frame 8 in a well-known manner and is urged into rest position against an overhanging portion of the sub-frame by spring 21.

An important feature of the mechanism is the novel credit adjustment means which depends upon the lateral position of stop screw 22 adapted to be selectively threaded into each of five spaced holes numbered D, E, F, G and H in the frame 1, best shown in Fig. 4.

The rotor 2 is provided with five radially offset spaced steps 23, 24, 25, 26 and 27 with each step positioned to abut screw 22 when in any one of holes lettered E through H in frame 1.

Thus the maximum selected credit position of the rotor is determined by the placement of screw 22.

Each credit coil is provided with a combination armature-pawl 4a, 5a and 6a hinged in frame 1, and independently urged into position shown by a separate spring 28, as shown. The upper end of each armature is provided with a pawl portion 29 and an interlock extension 30.

Thus, by virtue of the series inter-engagement of each armature extension with the adjacent armature, when coil 6 is energized only armature 6a will be attracted, and when coil 5 is energized both armatures 5a and 6a will be attracted, and when coil 4 is energized armatures 4a, 5a and 6a will be attracted.

Rotor 2 is also provided with a group of radially spaced credit teeth 31, two of which have different axial lengths, for providing two different credit values corresponding to coils 4 and 5.

The coil 6 corresponds to maximum credit value determined by screw 22.

A cam projection 32 integral with the rotor 2 is positioned to operate the actuating blade 33 of master control switch 11 when the rotor is moved one segment to and from its restored position.

Referring to Fig. 6 and the developed view of the rotor shown Fig. 7 the seven teeth 31 are equi-spaced and positioned to be sequentially engaged by the pawl 29 of the armature 6a.

An elongated tooth 37 is positioned to be engaged by pawl 29 of armature 4a, and the elongated tooth 36 is positioned to be engaged by pawl 29 of armature 5a.

A stop pin 38 integral with the rotor is positioned to abut with a projection 39 in frame 1 as a stop to limit rotation of the rotor beyond its restored position, as shown in Fig. 5.

The schematic diagram shown in Fig. 8 illustrated a typical electric circuit in which the device is used. The dotted outline 46 encloses the accumulator elements and the dotted outline 47 encloses the operative and responsive components of a service or vending machine.

Coin switches 48, 49 and 50 are responsive to coins of denominations A, B and C respectively. Electromagnet 51 includes lever means for rejecting and returning any coins deposited during the operation of the mechanism, when de-energized.

Coil 52 represents the element that operates, or conditions for operation the service or vending machine when energized.

Switch 53—54 in the said machine is adapted to be momentarily closed for each selected operation made in said machine.

An electromagnetic counter 55 is shown as an accessory connected to the mechanism for totalizing unit values delivered by said machine.

A conductor 56 connects switch blade 41, blade 33, coil 52, one terminal of coin switches 48, 49 and 50, and one side of a source of electric power $L_1$.

A conductor 57 connects one terminal of counter 55, restore coil 9, one terminal of credit coils 4, 5, and 6, one terminal of coin reject coil 51 to the remaining side of a source of power $L_2$.

Conductor 58 connects the remaining terminal of coil 9 switch blade 53 with an optional connection 58a to blade 44.

Conductor 59 connects blade 43, blade 34, coil 52 and blade 54.

Conductor 60 connects the remaining terminal of coil 55 to blade 42.

Conductor 61 connects blade 35 with the remaining terminal of coil 51.

Conductors 62, 63 and 64, independently connect coils 4, 5 and 6 with the remaining terminals of switches 48, 49 and 50 respectively.

Open switch blades 40 and 45 are provided for energizing external signal circuits not shown.

In operation and under the assumption the accumulator is in its restored position and is used in connection with a coin operated phonograph adapted to deliver one selection upon the deposit of a coin of denomination A (U.S. nickel), three selections for a coin B (U.S. dime), and seven selections for coin C (U.S. quarter). The latter number of selections corresponds to the position of stop screw 22 in hole E Fig. 4.

Under the above conditions the deposit of a single coin A will momentarily close switch 50 and energize coil 6 which will release the holding engagement of its armature-pawl 29 from the first tooth 31 and permit the rotor 2 to rotate in credit direction under the influence of spring 13.

The rotor will rotate through one unit credit angle, corresponding to the spacing of teeth 17, and come to rest with tooth 36 against the pawl 29 of armature 5a. During this movement the control switch 11 will operate and close blades 33—34 and energize a master responsive coil 52 in the machine which will electrically condition same for the selective operation by well known means, not shown. Switch blades 33—35 will open and de-energize coil 51, and by well-known means, reject any coins deposited in the machine until its selection and delivery operation is completed.

When a selection is made in the machine the switch blades 53—54 will be closed by the simultaneous movement of lever 65 shown Fig. 8 and energize restore coil 9 and thereby operate its armature-pawl 18 to engage and drive one restore tooth 17 and rotate the rotor in debit direction into its original restored position, by virtue of the holding ratchet action of the armature 6a, Figs. 5 and 6. Simultaneously the control switch 11 will be returned to its original position to de-energize the master coil 52 in the selective device and the signal switch 15 will be operated one time, the action of which will be hereinafter described.

When a coin B is deposited switch 49 will be momentarily closed and energize coil 5 and attract its armature 5a from the path of movement of tooth 36. Simultaneously the extension 30 on pawl 5a will engage and operate armature 6a and release rotor 2 for rotation through three unit credit angles to its intermediate credit position with tooth 37 resting against armature-pawl 4a. As previously described, the control switch 11 operated during the first credit angle rotation of the rotor 2 and its blades 33—34 remain closed until restored by the operation of the selective device.

When three selections are made in the machine, corresponding with said intermediate position, the restore coil 9 will drive rotor 2 three credit angles, in debit direction, to its restored position.

By means of a coin device and circuit not shown, the deposit of two coins of denomination A will energize both coils 6 and 5 and rotate rotor 2 to its intermediate credit position.

When a coin of denomination C is deposited switch 48 is momentarily closed and coil 4 energized and armature 4a attracted. Extension 30 on armature 4a will operate armature 5a and extension 30 on armature 5a will operate armature 6a whereby rotor 2 will be released to rotate to a total credit position against stop screw 22 abutting step 27 in the rotor which corresponds to the maximum number of unit credit angles as shown in Figs. 3 and 4, and corresponding with a seven selection credit in the machine.

The seven debit operations of restore coil 9 made by sequentially selecting 7 selections in the selecting device are the same as described in previous operations.

It is now apparent that the total credit position of the rotor may be adjusted in unit angles by the pre-selected position of screw 22, from three to seven credits corresponding to positions D through H, shown Fig. 4.

It is also apparent that various rotors having differently positioned credit teeth may be readily substituted for the rotor described to obtain different credit rotations corresponding to predetermined different credit values.

An electric counter 55 is connected to blades 41—42 of signal switch 15 for counting the exact number of debit operations for arriving at a numerical balance with the total coins deposited.

It is to be noted that when the accumulator is used with certain machines only a single closure of the delivery switch 53—54 is possible, hence the alternate connection 58 shown in Fig. 8 is made whereby switch blades 43—44 will intermittently open and close until delivery is completed and switch blades 53—54 are opened. The resultant vibratory action of armature 10 will return rotor 2 to its normal restored position.

The open switch blades 40 and 45 are useful for certain signal circuits controlled by debit action, not shown.

Having described my invention, I claim:

1. An accumulator comprising means forming a frame, means forming a rotor journalled for rotation about a fixed axis in said frame through a maximum number of unit credit angles in one direction from a restored position and for debit rotation in opposite direction, spring means for rotating said rotor in said one direction, a plurality of escapement teeth in predetermined annular spaced relation on said rotor for controlling a predetermined number of said unit credit angle rotation of said rotor corresponding to the position of each of said escapement teeth, a plurality of restore teeth in equal spaced annular relation on said rotor for rotating said rotor by said unit angle segments in said debit direction, a control cam on said rotor, electric switch means positioned in said frame for operation by said cam when said rotor is moved one said credit angle to and from said restored position, an external electric circuit means connected to and responsive to the said switch when energized, a plurality of electromagnetic escapement means in said frame operatively related to said escapement teeth, each of said escapement means adapted for intermittent engagement with corresponding one of said escapement teeth for releasing said rotor for different numbers of said credit angles of credit rotation when energized, an electromagnetic restore means in said frame operatively related to said restore teeth for segmentally rotating said rotor in said debit direction when intermittently energized, a plurality of radially spaced steps in said rotor for selectively controlling the maximum unit angle rotation of said rotor when a predetermined one of said escapement means is energized, adjustable stop means adapted to be positioned in the path of movement of each of said steps for selectively adjusting the said maximum unit rotation of said rotor whereby the selective energizing of each said escapement means will rotate said rotor corresponding different numbers of unit credit angles and simultaneously operate said switch means to control said circuit means and whereby the energizing of said predetermined one escapement means will release said rotor to rotate into a selected said maximum angle of rotation dependent upon the selected position of said stop means and whereby the intermittent energizing of said restore means will rotate said rotor in said debit direction to its said restored position and re-operate said switch means to complete the control of said circuit means.

2. In an accumulator of the character described means forming a frame, means forming a rotor journalled for rotation about a fixed axis in said frame a maximum number of unit credit angles of rotation in one direction from a restored position, spring means for rotating said rotor in said credit direction, a restore tooth on said rotor, a first credit tooth on said rotor in predetermined radial spaced position with respect to said restore tooth and laterally displaced therefrom, a first electromagnetic credit pawl in said frame normally in engagement with said restore tooth for holding said rotor in said restored position, said first credit pawl adapted to operate and release said rotor for a first credit rotation thereof when energized, a second credit tooth on said rotor in predetermined radial spaced position with respect to said first credit tooth and laterally spaced therefrom, a second electromagnetic pawl in said frame positioned in the path of movement of said first credit tooth for arresting the rotation of said rotor at a predetermined first angle of credit when said first pawl is energized and operated, a third electromagnetic pawl in said frame positioned in the path of movement of said second credit tooth adapted to be engaged thereby for arresting the rotation of said rotor at a predetermined second angle of credit when said second pawl is energized and operated, interconnect means on said second pawl adapted to engage and operate said first pawl when the former is energized, a plurality of radially spaced steps in said rotor for selectively arresting the rotation of said rotor at a selected one of a plurality of said maximum angles of unit credit rotation when said third pawl is energized and operated, an adjustable stop means in said frame for selected positioning in each path of movement of each of said steps, a second interconnecting means on said third pawl adapted to engage said second pawl for operating said first and second pawls when the former is energized whereby the selective energizing of each said electromagnetic pawl will release said rotor to rotate through a different angle of credit and the preselected position of said stop means will correspond with a selected maximum angle of credit rotation of said rotor.

3. In an accumulator of the character described means forming a frame, a cylindrical rotor journalled in said frame about its principal axis for credit rotation in one direction from a restored position and debit rotation in opposite direction, a plurality of equi-spaced teeth in annular position on said rotor, said teeth having radial spacing corresponding with a predetermined unit credit angle of rotation of said rotor, a cam means on said rotor, means for urging said rotor to rotate in said credit direction to a maximum credit position, electromagnetic restore means in said frame associated with said teeth for segmentally driving said rotor by said unit angle rotations in debit direction when intermittently energized, electric impulse means for intermittently energizing said restore means, electromagnetic credit means in said frame in ratchet engagement with said teeth for releasing said rotor for rotation in said credit direction when energized by a single electric impulse, means for momentarily energizing said credit means, an electric switch in said frame for controlling an electric circuit positioned for operation by said switch cam means when said rotor is moved through one said unit angle to and from said restored position, a plurality of credit steps in said rotor positioned adjacent each other and radially spaced in a predetermined number of said unit angles from each other, an adjustable stop means in said frame adapted to be selectively positioned in the path of movement of each of said steps for selectively adjusting the range of said credit rotation of said rotor whereby said rotor will rotate through a selected predetermined number of said unit credit angles and simultaneously operate said electric switch when said credit means is momentarily energized and whereby said rotor will be returned to said restored position and said electric switch re-operated when said credit means is intermittently energized a said predetermined selected number of times.

4. In an accumulator of the character described means forming a frame, means forming a rotor journalled for rotation in said frame about its axis through a maximum number of unit credit angles from a restored position to a total credit position, means for urging said rotor to rotate from said restored position to said maximum credit position, adjustable stop means in said frame adapted to engage and stop the rotation of said rotor for selectively changing the said total credit position of said rotor by said unit credit angles, a first tooth on said rotor corresponding with said restored position, a second tooth on said rotor radially displaced a predetermined number of said unit credit angles from said first tooth, a first pawl means in said frame normally in holding engagement with said first tooth and adapted to disengage therefrom when operated for releasing said rotor to rotate a predetermined number of said unit angles to an intermediate credit position, a second pawl means in said frame normally in the path of movement of said second tooth for engaging and arresting the rotation of said rotor at its said intermediate credit position and for disengaging said second tooth when operated and releasing said rotor to rotate to a preselected said total credit position corresponding to the selected adjustment of said stop means.

5. In an accumulator of the character described means forming a frame, means forming a rotor journalled for rotation in said frame about its axis through a maximum number of unit credit angles from a restored position to a total credit position, means for urging said rotor to rotate from said restored position to said maximum credit position, adjustable stop means in said frame adaptable to engage and stop the rotation of said rotor for selectively changing the said total credit position of said rotor by said unit credit angles, a first tooth on said rotor corresponding with said restored position, a second tooth on said rotor radially displaced a predetermined number of said unit credit angles from said first tooth, a first electromagnetic pawl means in said frame normally in holding engagement with said first tooth and adapted to disengage therefrom when energized for releasing said rotor to rotate a predetermined number of said unit angles to an intermediate credit position, a second electromagnetic pawl means in said frame normally in the path of movement of said second tooth for engaging and arresting the rotation of said rotor at its said intermediate credit position and for disengaging said second tooth when energized and releasing said rotor to rotate to a preselected said total credit position corresponding to the adjustment of said stop means, said second pawl means having an extension thereon adapted to engage and operate said first pawl means when the former is energized for releasing said rotor from its said restored position to a preselected total credit position.

References Cited in the file of this patent

UNITED STATES PATENTS

| | | |
|---|---|---|
| 1,958,763 | Mosfelt | May 15, 1934 |
| 1,974,207 | Ellinger | Sept. 18, 1934 |
| 2,299,082 | Elliot | Oct. 20, 1942 |
| 2,323,255 | Sutherland | June 29, 1943 |
| 2,323,981 | Du Grenier et al. | July 13, 1943 |
| 2,386,741 | Hohanson | Oct. 9, 1945 |
| 2,613,791 | Triman | July 13, 1949 |
| 2,518,810 | Nelsen et al. | Aug. 16, 1950 |
| 2,586,173 | Nelsen | Feb. 19, 1952 |
| 2,703,640 | Law | Mar. 8, 1955 |